(12) United States Patent
Kumawat et al.

(10) Patent No.: US 12,457,100 B2
(45) Date of Patent: Oct. 28, 2025

(54) METHOD AND SYSTEM FOR QUANTUM KEY DISTRIBUTION (QKD) WITHIN BLOCKCHAIN PLATFORMS

(71) Applicant: Mastercard International Incorporated, Purchase, NY (US)

(72) Inventors: Jaipal Singh Kumawat, Rajasthan (IN); Avinash Upadhyay, Noida (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 77 days.

(21) Appl. No.: 18/625,529

(22) Filed: Apr. 3, 2024

(65) Prior Publication Data

US 2025/0317279 A1    Oct. 9, 2025

(51) Int. Cl.
H04L 9/08    (2006.01)

(52) U.S. Cl.
CPC .................. *H04L 9/0852* (2013.01)

(58) Field of Classification Search
None
See application file for complete search history.

(56) References Cited

U.S. PATENT DOCUMENTS

| | | | | |
|---|---|---|---|---|
| 2022/0166616 | A1* | 5/2022 | Manevich | H04L 9/14 |
| 2025/0021982 | A1* | 1/2025 | Devaraj | G06Q 20/4016 |
| 2025/0119277 | A1* | 4/2025 | Khanna | H04L 9/50 |

FOREIGN PATENT DOCUMENTS

CN    115314196 A    11/2022

OTHER PUBLICATIONS

Brian P. Williams et al., Quantum Secret Sharing with Polarization-Entangled Photon Pairs, Department of Physics and Astronomy, The University of Tennessee, pp. 1-6, May 24, 2019.
Khodaiemehr, Hassan et al., Navigating the Quantum Computing Threat Landscape for Blockchains: A Comprehensive Survey, TechRxiv, Sep. 14, 2023, 63 pages.
Shuaishuai Liu et al., Experimental demonstration of multiparty quantum secret sharing and conference key agreement, npj Quantum information, 2023, 11 pages.
Chen-Long Li et al., Breaking the rate-distance limitation of measurement-device-independent quantum secret sharing, Physical Review Research 5, Aug. 4, 2023, 13 pages.
Stefan Richter et al., Agile and Versatile Quantum Communication: Signatures and Secrets, Physical Review X 11, Feb. 24, 2021, 17 Pages.

* cited by examiner

*Primary Examiner* — Trang T Doan
(74) *Attorney, Agent, or Firm* — Panitch Schwarze Belisario & Nadel LLP

(57) ABSTRACT

A method for improved security in blockchains using quantum key distribution includes: storing a first cryptographic key; establishing a first communication channel with an external device; generating a second cryptographic key over the first communication channel using quantum key distribution; encrypting a data set using the second cryptographic key; generating a blockchain data entry including at least the encrypted data set; and transmitting the blockchain data entry to a blockchain node in a blockchain network causing the blockchain node to verify the blockchain data entry and add the blockchain data entry into a new block added to a blockchain associated with the blockchain network.

16 Claims, 9 Drawing Sheets

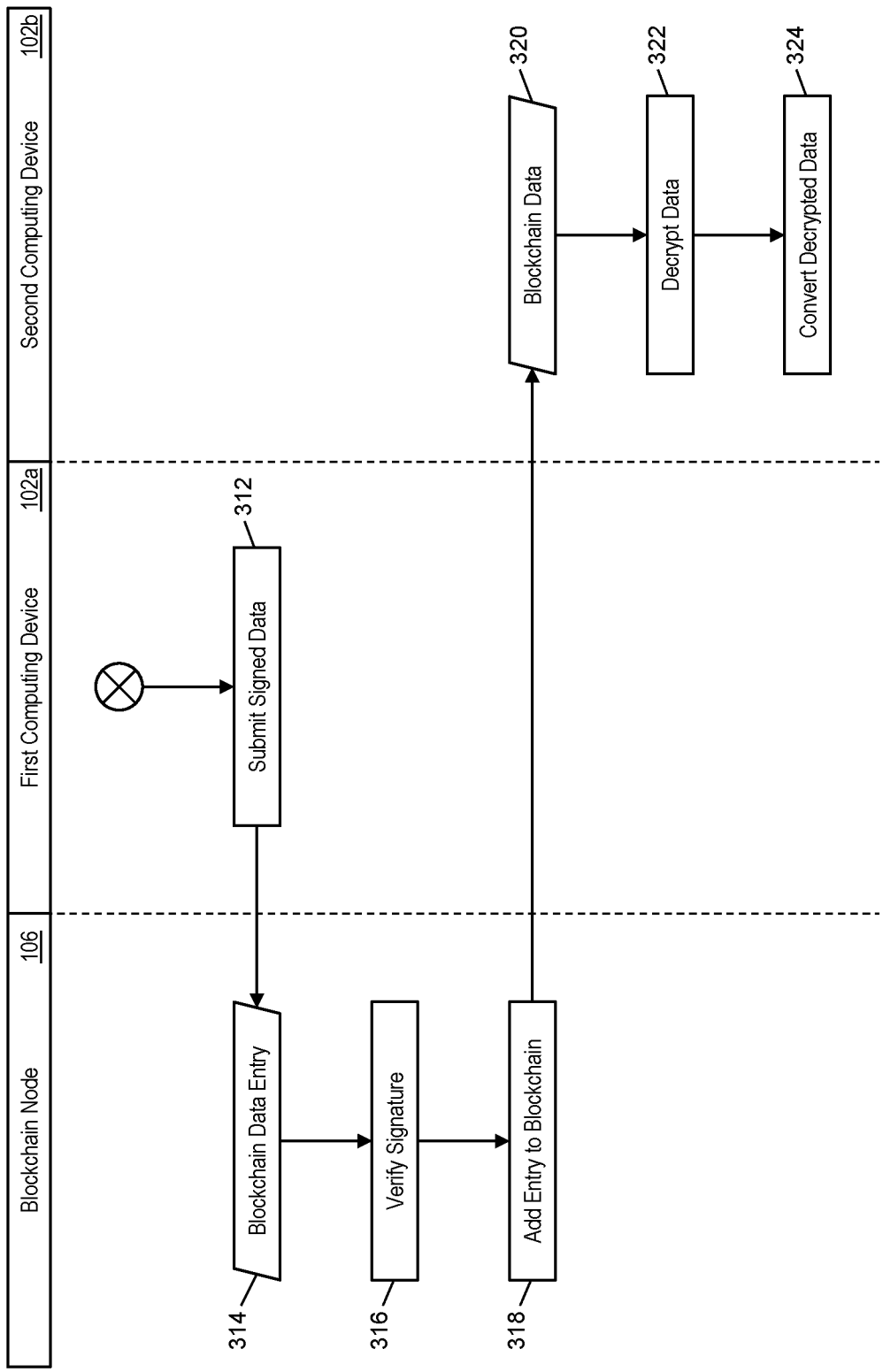

METHOD AND SYSTEM FOR QUANTUM KEY DISTRIBUTION (QKD) WITHIN BLOCKCHAIN PLATFORMS

FIELD

The present disclosure relates to the use of quantum key distribution (QKD) within blockchain platforms, specifically the use of QKD to encrypt data that is stored in a blockchain for greater security and the use of quantum secret sharing to provide even further benefits.

BACKGROUND

As technology improves and computing power becomes stronger, there is a need for added levels of security in the exchange of data. In recent years, blockchain has been used as a secure and efficient means for the storage and exchange of data. The immutability of blockchains can provide protection against tampering while the use of traditional encryption methods allows for data to be easily accessible for any authorized party and yet unusable by any unauthorized users. However, as quantum computing and other advanced technologies are developed, traditional encryption and cryptography methods are at risk of compromise.

Thus, there is a need for a technological improvement as to how data is protected, stored, and distributed to remain secure and uncompromised as computing technology improves.

SUMMARY

The present disclosure provides a description of systems and methods for improved security in blockchains using quantum key distribution. Prior to the storage of data on a blockchain, the computing device that will be submitting the data will utilize quantum key distribution to generate a quantum encryption key shared with an external device that is authorized to access the data. The computing device can encrypt the data using the quantum encryption key prior to digitally signing the encrypted data using a cryptographic key. The digitally signed, encrypted data can be transmitted to a blockchain node in a blockchain network, which can verify the digital signature using knowledge regarding the cryptographic key used for the signature and then add the encrypted data to a blockchain associated with the blockchain network. The use of encryption via quantum encryption keys ensures that the data in its encrypted form can be made public and securely stored on a blockchain while preventing unauthorized decryption except for by the computing device and external device, and where any attempt at compromise the quantum encryption key is immediately known. The use of quantum secret sharing to separate the quantum encryption key into multiple shares where at least two shares are required to recreate the quantum encryption key can further enhance security while enabling multiple parties to gain the benefits of the increased security of quantum encryption while keeping the accessibility of the data via blockchain. This results in significant improvements over traditional security methods related to blockchain without having to modify existing blockchain functionality.

A method for improved security in blockchains using quantum key distribution includes: storing, in a memory of a computing device, a first cryptographic key; establishing, by the computing device, a first communication channel with an external device; generating, by a processor of the computing device, a second cryptographic key over the first communication channel using quantum key distribution; encrypting, by the processor of the computing device, a data set using the second cryptographic key; generating, by the processor of the computing device, a blockchain data entry including at least the encrypted data set; digitally signing, by the processor of the computing device, the generated blockchain data entry using the first cryptographic key; and transmitting, by a transmitter of the computing device, the digitally signed blockchain data entry to a blockchain node in a blockchain network causing the blockchain node to verify the blockchain data entry and add the blockchain data entry into a new block added to a blockchain associated with the blockchain network.

A system for improved security in blockchains using quantum key distribution includes: a computing device; an external device; and a blockchain network including a blockchain node, wherein the computing device establishes a first communication channel with an external device and includes a memory storing a first cryptographic key, a processor generating a second cryptographic key over the first communication channel using quantum key distribution, encrypting a data set using the second cryptographic key, generating a blockchain data entry including at least the encrypted data set, and digitally signing the generated blockchain data entry using the first cryptographic key, and a transmitter transmitting the digitally signed blockchain data entry to the blockchain node causing the blockchain node to verify the blockchain data entry and add the blockchain data entry into a new block added to a blockchain associated with the blockchain network.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIGS. 3A and 3B are a flow diagram illustrating a process for the improved security in blockchain using dynamic wave encryption in the system of FIG. 1 in accordance with exemplary embodiments.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

System for Increased Security in Blockchains

Figure 1:
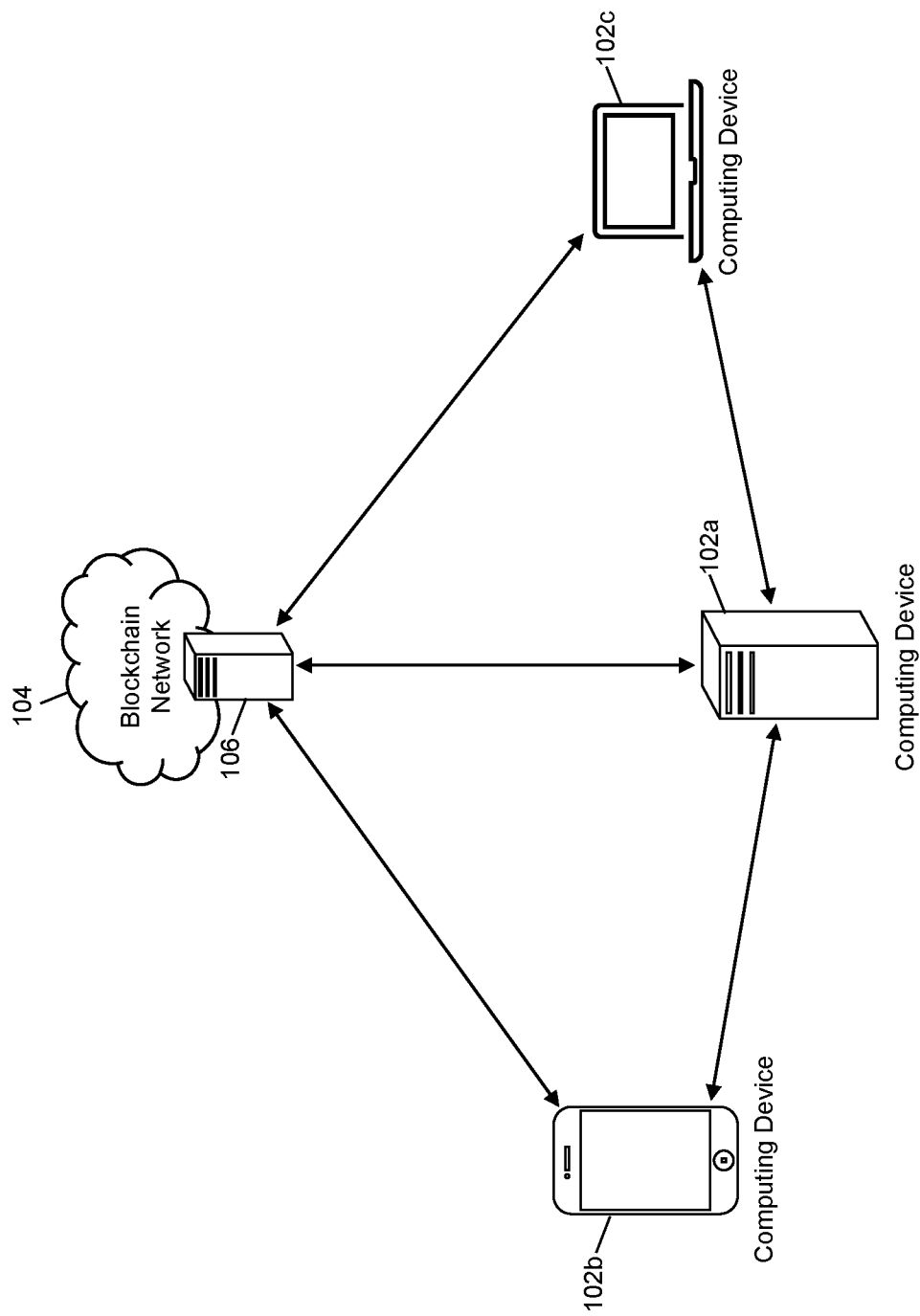
FIG. 1 is a block diagram illustrating a high level system architecture for improved security in blockchain using dynamic wave encryption and quantum key distribution in accordance with exemplary embodiments.

FIG. 1 illustrates a system 100 for increased security in blockchains through the use of dynamic wave encryption and quantum key distribution. The system 100 can include a plurality of computing devices 102, illustrated in FIG. 1 as a first computing device 102a, second computing device 102b, and third computing device 102c. Computing devices 102, discussed in more detail below, can be any type of device suitable for interacting with a blockchain network 104 and performing the functions discussed herein, such as a specifically programmed desktop computer, laptop computer, notebook computer, tablet computer, cellular phone, smart phone, smart television, wearable computing device, implantable computing device, etc.

Figure 7:
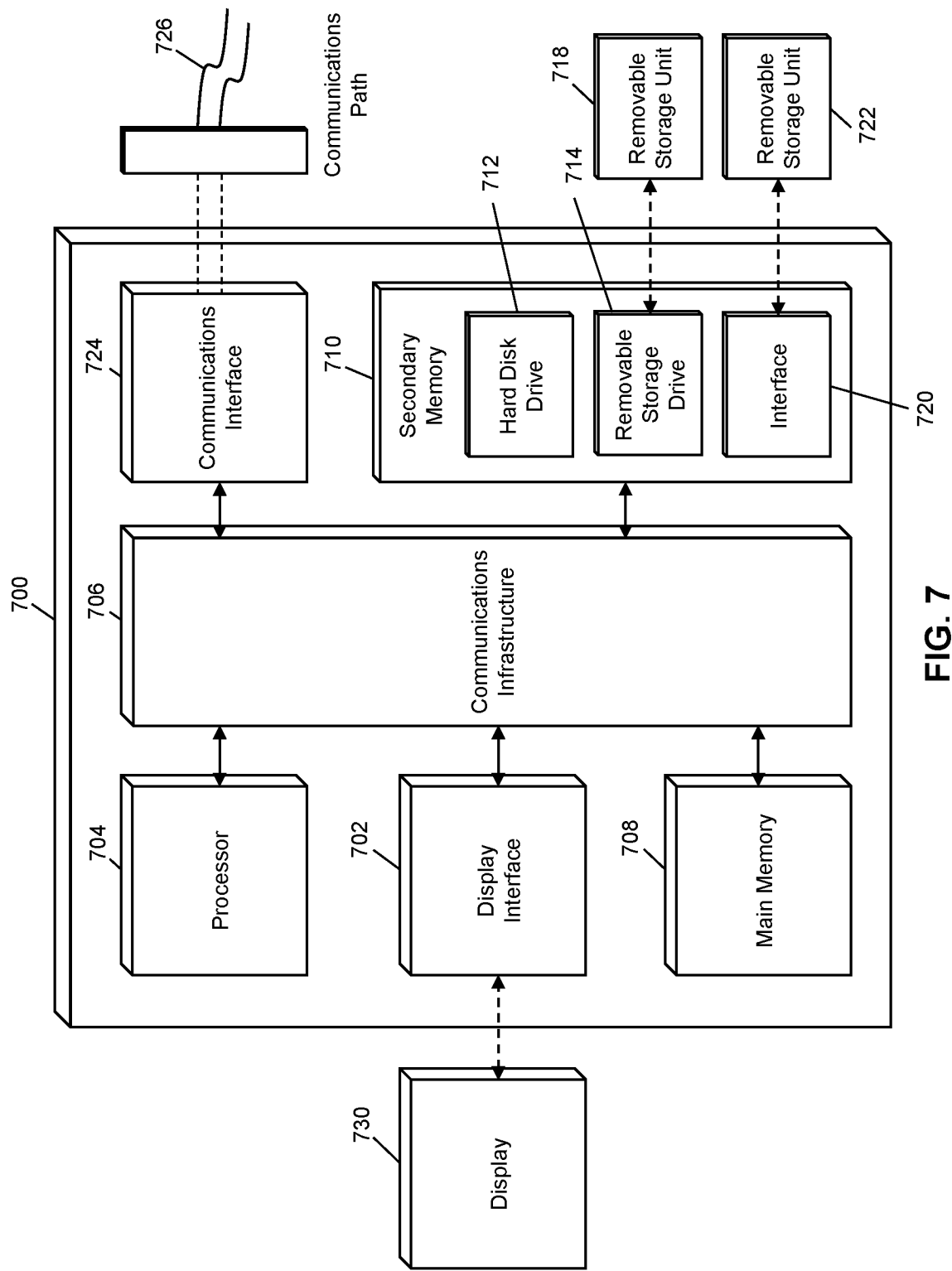
FIG. 7 is a block diagram illustrating a computer system architecture in accordance with exemplary embodiments.

The system 100 can also include the blockchain network 104. The blockchain network 104 can be comprised of a plurality of blockchain nodes 106. Each blockchain node 106 can be a computing system, such as illustrated in FIGS. 7, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain can be a distributed ledger that is comprised of at least a plurality of blocks. Each block can include at least a block header and one or more data values. Each block header can include at least a timestamp, a block reference value, and a data reference value. The timestamp can be a time at which the block header was generated and can be represented using any suitable method (e.g., UNIX timestamp, DateTime, etc.). The block reference value can be a value that references an earlier block (e.g., based on timestamp) in the blockchain. In some embodiments, a block reference value in a block header can be a reference to the block header of the most recently added block prior to the respective block. In an exemplary embodiment, the block reference value can be a hash value generated via the hashing of the block header of the most recently added block. The data reference value can similarly be a reference to the one or more data values stored in the block that includes the block header. In an exemplary embodiment, the data reference value can be a hash value generated via the hashing of the one or more data values. For instance, the block reference value can be the root of a Merkle tree generated using the one or more data values.

The use of the block reference value and data reference value in each block header can result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node 106 in a blockchain network 104 prior to the generation and addition of a new block to the blockchain in order for the change to be made permanent. Computational and communication limitations can make such a modification exceedingly difficult, if not impossible, thus rendering the blockchain immutable.

In some embodiments, the blockchain can be used to store information regarding blockchain transactions conducted between two different blockchain wallets. A blockchain wallet can include a private key of a cryptographic key pair that is used to generate digital signatures that serve as authorization by a payer for a blockchain transaction, where the digital signature can be verified by the respective blockchain network 104 using the public key of the cryptographic key pair. In some cases, the term "blockchain wallet" can refer specifically to the private key. In other cases, the term "blockchain wallet" can refer to a computing device (e.g., computing device 102) that stores the private key for use thereof in blockchain transactions. For instance, each computing device can each have their own private key for respective cryptographic key pairs and can each be a blockchain wallet for use in transactions with the blockchain associated with the blockchain network. Computing devices can be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain can correspond to a blockchain transaction or other storage of data, as applicable. A blockchain transaction can consist of at least: a digital signature of the sender of that is generated using the sender's private key, a blockchain address of the recipient of currency generated using the recipient's public key, and a blockchain currency amount that is transferred or other data being stored. In some blockchain transactions, the transaction can also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction can also include the sender's public key, for use by an entity in validating the transaction. For the traditional processing of a blockchain transaction, such data can be provided to a blockchain node 106 in a blockchain network 104, either by the sender or the recipient. The node can verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block can be validated by other blockchain nodes 106 in the blockchain network 104 before being added to the blockchain and distributed to the blockchain nodes 106 in the blockchain network 104, respectively, in traditional blockchain implementations. In cases where a blockchain data value cannot be related to a blockchain transaction, but instead the storage of other types of data, blockchain data values can still include or otherwise involve the validation of a digital signature.

In the system 100, addition security can be introduced into the blockchain with respect to the data stored in the blockchain and communications between computing devices 102, between computing devices 102 and blockchain nodes 104, and between blockchain nodes 104 through the use of dynamic waveform encryption, quantum key distribution, quantum shared secrets, or any combination of such functionality.

Data that is stored on the blockchain can utilize dynamic waveform encryption for an added level of security to protect the data from unauthorized access and use. The use of dynamic waveform encryption can ensure that the protected data is publicly accessible in its converted, encrypted form for ease of access by authorized entities, but where the original data, before conversion and encryption, is practically impossible to access by any unauthorized party. A first computing device 102a can have a data set that is to be provided to a second computing device 102b. The data set can be plaintext or any type of data that can be converted using the methods discussed herein. The first computing device 102a can convert the data set into a quantum wavefunction, which involves solving the Schrödinger wave equation—a fundamental equation in quantum mechanics that describes the behavior of a quantum system. The quantum wavefunction is a mathematical function that predicts and/or provides a description of a quantum system, specifying the probabilities for various outcomes when measurements are made. The conversion into a quantum wavefunction can include converting the data set into a plurality of quantum bits, also known as "qubits," where each qubit represents a bit of the data set. In some cases, the data set can be converted into a binary representation prior to being converted into the quantum wavefunction. The quantum wavefunction can exist in a superposition state, making determination (e.g., buy quantum computers) of the underlying data set impossible without adequate knowledge. Quantum computers may use different methods to represent and manipulate quantum states, e.g., the use of quantum gates and algorithms like those based on the principles of superposition and entanglement. The wavefunctions in quantum computing are often manipulated through unitary transformations to perform quantum computations.

Once the data set has been converted into the quantum wavefunction, the first computing device 102a can encrypt the quantum wavefunction using an encryption key. In some cases, a quantum encryption key (e.g., entangled particle) can be used, such as generated using a process described below utilizing quantum key distribution (QKD) and/or a quantum secret sharing. The computing device 102a can then electronically transmit the encrypted quantum wavefunction using a suitable communication method (e.g., secure quantum channel) to the second computing device 102b. In some cases, the computing device 102a can directly transmit the encrypted quantum wavefunction to the second computing device 102b. In other cases, the computing device 102a can submit the encrypted quantum wavefunction to a blockchain node 106, where the blockchain node 106 can add the encrypted quantum wavefunction into a new block that is added to the blockchain, which can then be retrieved by the second computing device 102b using suitable methods.

Once the second computing device 102b has received the encrypted quantum wavefunction, the second computing device 102b, by applying an appropriate quantum operation, can decrypt the encrypted quantum wavefunction using the encryption key. The second computing device 102b will then be in possession of the quantum wavefunction, which can be converted into the data set. In some cases, the first computing device 102a can communicate any additional knowledge needed to make the conversion of the quantum wavefunction back into the data set, such as information regarding measurement basis, representation, etc. The result is that only the second computing device 102b, as an authorized recipient, can successfully convert the quantum wavefunction back into the data set, and only after the proper encryption key is used for decryption, providing for significant security of the data set, even when a public method of communication is used, such as storage in a blockchain.

QKD systems provide a way to detect the presence of an eavesdropper because the act of measuring quantum states will inevitably disturb the system. QKD is a secure communication method that uses principles of quantum mechanics to enable two entities to produce a shared random secret key. Keys generated using QKD are referred to as quantum keys. This random secret key (produced by the two entities) may then be used to encrypt and decrypt messages, thereby providing a high level of security against eavesdropping or unauthorized access. The fundamental idea behind QKD is based on the properties of quantum states. Specifically, it relies on the principle that the act of measuring a quantum system disturbs that system. As a result, if an eavesdropper attempts to intercept the quantum key during transmission, the quantum properties of the particles being used for the key exchange will be altered. This interference can then be detected by the authentic users.

QKD typically uses particles of light (e.g., photons) to transmit information. Photons may exist in multiple states simultaneously, which is a property known as superposition. In some QKD protocols, pairs of entangled particles are used. Entanglement is a quantum phenomenon in which two particles become correlated, and changes to the state of one of those particle instantaneously affect the state of the other particle regardless of the distance between the two of them.

With respect to FIG. 1, (QKD) can be used to generate encryption keys that are used to perform encryption in communications in the system 100 including communications between computing devices 102, between computing devices 102 and blockchain nodes 104, and between blockchain nodes 104. Quantum keys can be used, for instance, to encrypt the converted quantum wavefunctions that are communicated between computing devices 102 or stored in the blockchain.

To generate a pair of quantum keys, two devices, such as the first computing device 102a and the second computing device 102b, first establish a first communication channel using a suitable communication method. In some cases, the first communication channel can be a quantum communication channel, which allows quantum information to be transmitted. The first computing device 102a creates a random bit and then randomly selects a measurement basis to transmit in. The first computing device 102a prepares a photon polarization state depending on the value of the random bit and the measurement basis and then transmits a single photon in that state to the second computing device 102b using the quantum communication channel. This process is repeated for a plurality of photons, where the number of photons sent can be increased to provide an added level of security.

The second computing device 102b receives each photon via the first communication channel and measures each photon using a randomly selected measurement basis. Once all of the photons have been received and measured by the second computing device 102b, the second computing device 102b can communicate the measurement basis used for each photon to the first computing device 102a using the first communication channel. The first computing device 102a communicates the measurement basis that the first computing device 102a used back to the second computing device 102b also using the first communication channel. In some cases, communications regarding the measurement bases can be made via a second communication channel, which can be a standard communication channel. In some instances, measurement basis information can be transmitted via a secure communication channel, where one or more security measures are used to protect communications made using the secure communication channel. The first computing device 102a and the second computing device 102b then discard the photon measurements where a different basis was used by the two computing devices 102, where the remaining bits serve as the quantum encryption key.

The quantum encryption key can then be used by the first computing device 102a to encrypt data, such as a quantum wavefunction, where only the second computing device 102b is capable of decrypting the data by virtue of possessing the same quantum encryption key. The use of quantum states and quantum entanglement ensures that any information obtained regarding polarization of the photons will affect measurements regarding the states of the photons, immediately informing the first computing device 102a and the second computing device 102b of an attempted compromise of the quantum encryption keys. The first computing device 102a and the second computing device 102b can use remaining photons whose states are not compromised for a modified version of the quantum key or can repeat the process to generate a new quantum key for ongoing communications.

The use of quantum keys for encryption can provide an added level of security for communications made in the blockchain network 104 as well as for data stored in the blockchain. In some embodiments, all communications made in the blockchain network 104 can be encrypted using quantum keys. For instance, when a computing device 102 is submitting new data to be stored in a blockchain data entry that is to be added to the blockchain, the new data can be encrypted via a quantum key prior to being transmitted to a blockchain node 106. In such an instance, the computing device 102 and the blockchain node 106 can first perform a quantum key distribution process, discussed above, such that each possess a quantum key for encryption and decryption of the communication. In some cases, the computing device 102 can still digitally sign the data using a private key of a cryptographic key pair prior to encryption, where the blockchain node 106 can decrypt the data using the quantum key and then verify the digital signature using the public key of the cryptographic key pair as part of the verification process used prior to including the blockchain data entry in a new block using traditional methods.

In some embodiments, quantum secret sharing can be used to provide further security regarding transmitted data and to enable a quantum key to be used by multiple, authorized parties. In such an embodiment, the first computing device 102a can generate a quantum key through quantum key distribution with a second device, such as a blockchain node 106. After the quantum key has been obtained, the first computing device 102a can separate the quantum key into a plurality of shares. Each share can then be distributed to other devices where a scheme and size of each share is used such that only a predetermined minimum number of shares can be used to recreate the quantum key for use in decrypting data encrypted using that quantum key. Secret sharing schemes that can be used can include Shamir's secret sharing scheme or Blakely's secret sharing scheme. In an example, the first computing device 102a can separate the quantum key into two shares and distribute a first share to the second computing device 102b and a third share to the third computing device 102c. The shares and scheme can be such that both shares are necessary to recreate the quantum key, which can prevent the second computing device 102b and third computing device 102c from decrypting data encrypted using the quantum key individually but can successfully recreate the quantum key and decrypt the data if working together. This can provide an even greater level of security for data that is encrypted and stored on a blockchain.

In one example, the methods discussed herein can be used to store medical information that can only be accessed when authorized by the individual to which the medical information relates. The first computing device 102a can be a device in a system of a medical service provider, such as a doctor's office. The first computing device 102a can create a health profile for an individual that can only be accessed by parties authorized by that individual. The first computing device 102a can create a quantum key that is used to encrypt the health profile, where the encrypted health profile is then stored on the blockchain. The first computing device 102a can separate the quantum key into at least two shares where both shares are required to recreate the quantum key. A first of the two shares can be provided to a second computing device 102b specified by the individual to whom the health profile corresponds. The second of the two shares can be made available by the first computing device 102a, such as upon request by another medical service provider. In an example, the individual may move to a new area and visit a new doctor that wants access to the individual's health profile. The new doctor can request the health profile from the original doctor's office, and the original doctor's office can provide the second share to the new doctor using a suitable communication method. The new doctor can then ask the individual for the first share. If the individual provides the first share, the new doctor can then recreate the quantum key and decrypt the encrypted health profile stored on the blockchain. This enables the health profile to only be accessed when directly authorized by the individual and prevents access even if one of the shares is intercepted or compromised.

The methods and systems discussed herein provide for increased security in the exchange and storage of data in blockchains. Dynamic waveform encryption can be used to protect data that is exchanged between two parties or stored in a blockchain. Quantum key distribution can also protect exchange data and communications, while the use of quantum secret sharing provides this protection across multiple entities in cases where more than two participants are involved. A combination of these techniques can greatly increase the level of security such that unauthorized access to data is practically impossible even with significantly advanced computing technologies. The result is a system that provides security beyond anything available using traditional methods and without the need for additional parties or additional processes that can introduce more potential vectors for compromise.

Computing Device

Figure 2:
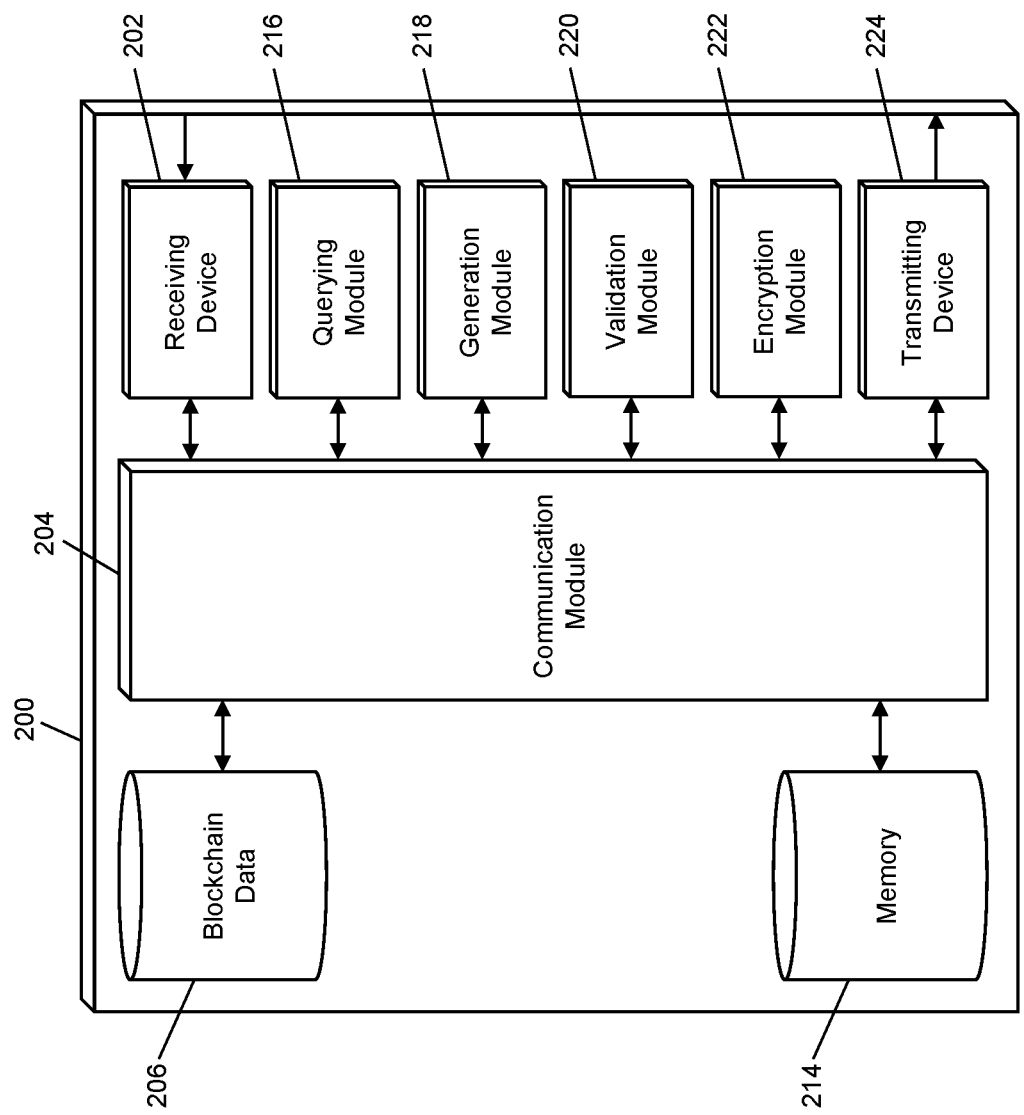
FIG. 2 is a block diagram illustrating a computing device in the system of FIG. 1 for improved security in blockchain using dynamic wave encryption and quantum key distribution in accordance with exemplary embodiments.

FIG. 2 illustrates an embodiment of a computing device 102. It will be apparent to persons having skill in the relevant art that the embodiment of the computing device 200 illustrated in FIG. 2 is provided as illustration only and cannot be exhaustive to all possible configurations of the computing device 200 suitable for performing the functions as discussed herein. For example, the computer system 700 illustrated in FIG. 7 and discussed in more detail below can be a suitable configuration of the computing device 102.

The computing device 102 can include a receiving device 202. The receiving device 202 can be configured to receive data over one or more networks via one or more network protocols. In some instances, the receiving device 202 can be configured to receive data from other computing devices 102, blockchain nodes 106, and other systems and entities via one or more communication methods, such as radio frequency, local area networks, wireless area networks, cellular communication networks, Bluetooth, the Internet, etc. In some embodiments, the receiving device 202 can be comprised of multiple devices, such as different receiving devices for receiving data over different networks, such as a first receiving device for receiving data over a local area network and a second receiving device for receiving data via the Internet. The receiving device 202 can receive electronically transmitted data signals, where data can be superimposed or otherwise encoded on the data signal and decoded, parsed, read, or otherwise obtained via receipt of the data signal by the receiving device 202. In some instances, the receiving device 202 can include a parsing module for parsing the received data signal to obtain the data superimposed thereon. For example, the receiving device 202 can include a parser program configured to receive and transform the received data signal into usable input for the functions performed by the processing device to carry out the methods and systems described herein.

The receiving device 202 can be configured to receive data signals electronically transmitted by other computing devices 102 that can be superimposed or otherwise encoded with quantum wavefunctions, encrypted data, quantum key shares, measurement bases, photons, or other data used in performing the functions discussed herein. The receiving device 202 can also be configured to receive data signals electronically transmitted by blockchain nodes 106, which can be superimposed or otherwise encoded with measurement bases, photons, blockchain data entries, blocks, other blockchain data, or other data used in performing the functions discussed herein.

The computing device 102 can also include a communication module 204. The communication module 204 can be configured to transmit data between modules, engines, databases, memories, and other components of the computing device 102 for use in performing the functions discussed herein. The communication module 204 can be comprised of one or more communication types and utilize various communication methods for communications within a computing device. For example, the communication module 204 can be comprised of a bus, contact pin connectors, wires, etc. In some embodiments, the communication module 204 can also be configured to communicate between internal components of the computing device 102 and external components of the computing device 102, such as externally connected databases, display devices, input devices, etc. The computing device 102 can also include a processing device. The processing device can be configured to perform the functions of the computing device 102 discussed herein as will be apparent to persons having skill in the relevant art. In some embodiments, the processing device can include and/or be comprised of a plurality of engines and/or modules specially configured to perform one or more functions of the processing device, such as a querying module 216, generation module 218, validation module 220, encryption module 222, etc. As used herein, the term "module" can be software or hardware particularly programmed to receive an input, perform one or more processes using the input, and provides an output. The input, output, and processes performed by various modules will be apparent to one skilled in the art based upon the present disclosure.

The computing device 102 can also include blockchain data 206, which can be stored in a memory 214 of the computing device 102 or stored in a separate area within the computing device 102 or accessible thereby. The blockchain data 206 can include a blockchain, which may be comprised of a plurality of blocks and be associated with the blockchain network 104 and a blockchain. In some cases, the blockchain data 206 can further include any other data associated with the blockchain and management and performance thereof, such as block generation algorithms, digital signature generation and confirmation algorithms, communication data for blockchain nodes 106, smart contracts, cryptographic keys, etc.

The computing device 102 can also include a memory 214. The memory 214 can be configured to store data for use by the computing device 102 in performing the functions discussed herein, such as public and private keys, symmetric keys, etc. The memory 214 can be configured to store data using suitable data formatting methods and schema and can be any suitable type of memory, such as read-only memory, random access memory, etc. The memory 214 can include, for example, encryption keys and algorithms, communication protocols and standards, data formatting standards and protocols, program code for modules and application programs of the processing device, and other data that can be suitable for use by the computing device 102 in the performance of the functions disclosed herein as will be apparent to persons having skill in the relevant art. In some embodiments, the memory 214 can be comprised of or can otherwise include a relational database that utilizes structured query language for the storage, identification, modifying, updating, accessing, etc. of structured data sets stored therein. The memory 214 can be configured to store, for example, device profiles, device profile data, configuration keys, cryptographic keys including public keys and/or private keys, communication data, blockchain algorithms and data, measurement basis data, photon polarization data, quantum keys, quantum key shares, quantum wavefunction conversion data, etc.

The computing device 102 can include a querying module 216. The querying module 216 can be configured to execute queries on databases to identify information. The querying module 216 can receive one or more data values or query strings and can execute a query string based thereon on an indicated database, such as the blockchain data 206 of the computing device 102 to identify information stored therein. The querying module 216 can then output the identified information to an appropriate engine or module of the computing device 102 as appropriate. The querying module 216 can, for example, execute a query on the memory 214 to identify a quantum key used to decrypt data accessed from the blockchain.

The computing device 102 can also include a generation module 218. The generation module 218 can be configured to generate data for use by the computing device 102 in performing the functions discussed herein. The generation module 218 can receive instructions as input, can generate data based on the instructions, and can output the generated data to one or more modules of the computing device 102. For example, the generation module 218 can be configured to generate blockchain data entries, quantum keys, quantum key shares, encryption keys, digital signatures, measurement bases, quantum wavefunction conversions, etc.

The computing device 102 can also include a validation module 220. The validation module 220 can be configured to perform data validations and verifications for the computing device 102 as part of the functions discussed herein. The validation module 220 can receive instructions as input, can perform data validations or verification as instructed, and can output a result of the data validations or verifications to one or more modules of the computing device 102. In some cases, the input can include the data to be validated or verified and/or data to be used in the validation or verification. In other cases, the validation module 220 can be configured to identify such data, such as in the blockchain data 206 and/or memory 214. The validation module 220 can be configured to, for example, verify digital signatures, validate common measurement bases, etc.

The computing device 102 can also include an encryption module 222. The encryption module 222 can be configured to encrypt and/or decrypt data for the computing device 102 as part of the functions discussed herein. The encryption module 222 can receive instructions as input, can encrypt or decrypt data as instructed, and can output a result of the encryption or decryption to one or more modules of the computing device 102. In some cases, the input can include the data to be encrypted or decrypted and/or keys for use in the encryption or decryption. In other cases, the encryption module 222 can be configured to identify such data, such as in the memory 214. The encryption module 222 can be configured to encrypt data using quantum keys, decrypt data using quantum keys, etc.

The computing device 102 can also include a transmitting device 224. The transmitting device 224 can be configured to transmit data over one or more networks via one or more network protocols. In some instances, the transmitting device 224 can be configured to transmit data to other computing devices 102, blockchain nodes 106, and other entities via one or more communication methods, local area networks, wireless area networks, cellular communication, Bluetooth, radio frequency, the Internet, etc. In some embodiments, the transmitting device 224 can be comprised of multiple devices, such as different transmitting devices for transmitting data over different networks, such as a first transmitting device for transmitting data over a local area network and a second transmitting device for transmitting data via the Internet. The transmitting device 224 can electronically transmit data signals that have data superimposed that can be parsed by a receiving computing device. In some instances, the transmitting device 224 can include one or more modules for superimposing, encoding, or otherwise formatting data into data signals suitable for transmission.

The transmitting device 224 can be configured to electronically transmit data signals to other computing devices 102 that can be superimposed or otherwise encoded with quantum wavefunctions, encrypted data, quantum key shares, measurement bases, photons, or other data used in performing the functions discussed herein. The transmitting device 224 can also be configured to electronically transmit data signals to blockchain nodes 106, which can be superimposed or otherwise encoded with blockchain data entries, requests for blockchain data, digitally signed data, encrypted data, measurement bases, photons, etc.

Process for Data Exchange Using Dynamic Waveform Encryption

Figure 3A:
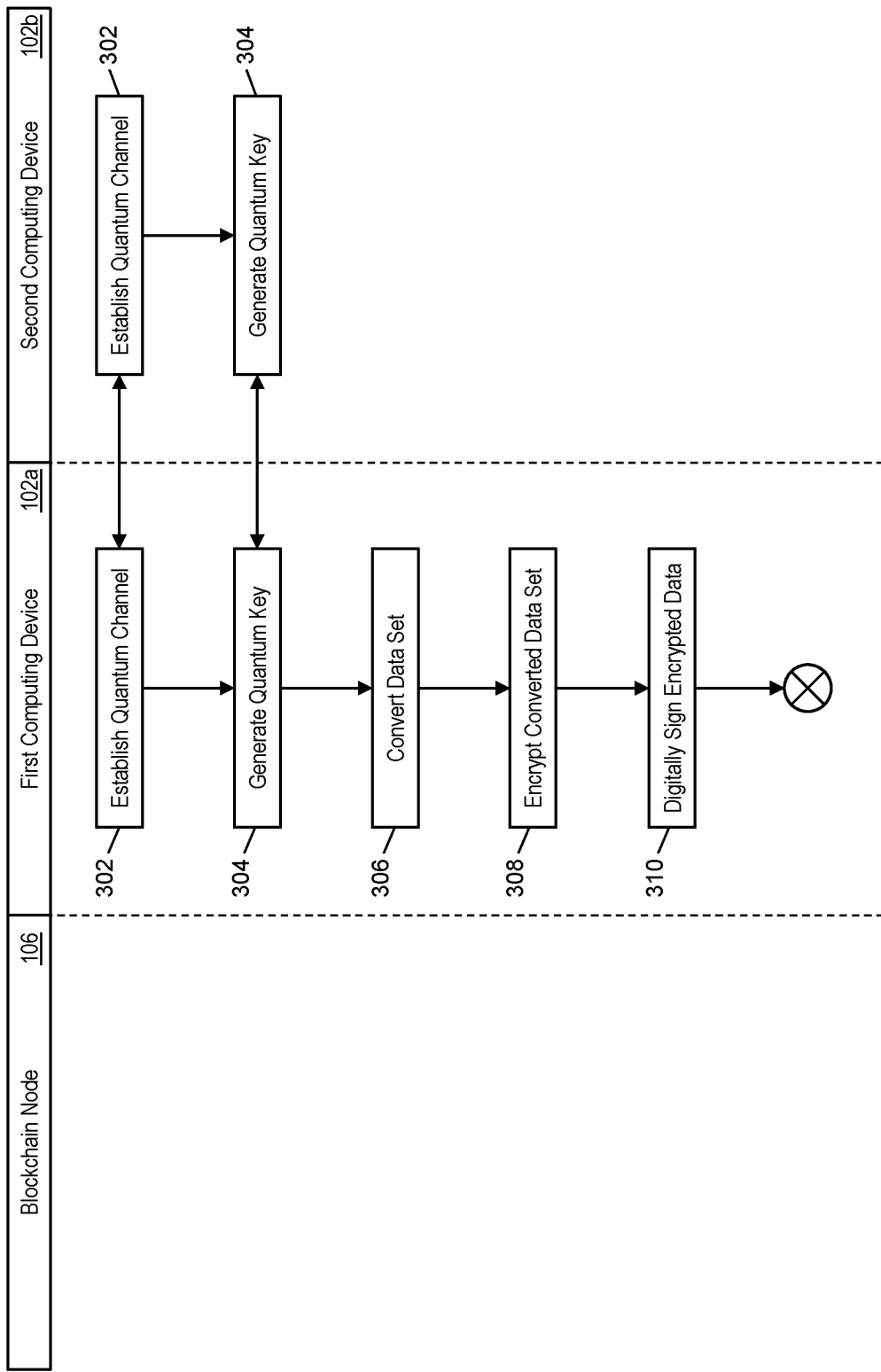

FIGS. 3A and 3B illustrate a process in the system 100 of FIG. 1 for the secure exchange of data on a blockchain using dynamic waveform encryption and quantum key distribution.

In step 302, the first computing device 102a and the second computing device 102b can establish a quantum communication channel. Using the quantum communication channel, in step 304, the first computing device 102a and the second computing device 102b can generate a pair of quantum encryption keys using the method discussed above. In step 306, the first computing device 102a can (e.g., via generation module 218) convert a data set to be exchanged into a quantum wavefunction. In step 308, the first computing device 102a can (e.g., via encryption module 222) encrypt the quantum wavefunction using the quantum encryption key. In step 310, the first computing device 102a can (e.g., via generation module 218) generate a digital signature over the encrypted quantum wavefunction using a private key of a cryptographic key pair used as the first computing device's blockchain wallet.

In step 312, the first computing device 102a can electronically transmit (e.g., via transmitting device 224) the signed encrypted quantum wavefunction to a blockchain node 104 using a suitable communication network and method. In step 314, the blockchain node 104 can receive the digitally signed encrypted quantum wavefunction. In step 316, the blockchain node 104 can verify the digital signature using the corresponding public key of the cryptographic key pair of the first computing device's blockchain wallet and perform any other data necessary to validate the received data prior to its inclusion in the blockchain. After verifications and validations have been performed, then, in step 318, the blockchain node 104 can add a new blockchain data entry that includes the encrypted quantum wavefunction to the blockchain, such as by including the new blockchain data entry in a new block that is confirmed and added to the blockchain using traditional methods and systems.

In step 320, the second computing device 102b can (e.g., via receiving device 202) access the new blockchain data entry from the blockchain that includes the encrypted quantum wavefunction. In step 322, the second computing device 102b can (e.g., via encryption module 222) decrypt the encrypted quantum wavefunction using its quantum encryption key that was generated in step 304. Then, in step 324, the second computing device 102b can (e.g., via generation module 218) convert the quantum wavefunction back into the original data set. This can result in the data set being made available on a publicly accessible and immutable storage medium but being inaccessible to anyone besides the second computing device 102b through use of dynamic wave encryption as well as quantum key distribution.

Process for Data Exchange Using Quantum Secret Sharing

Figure 4A:
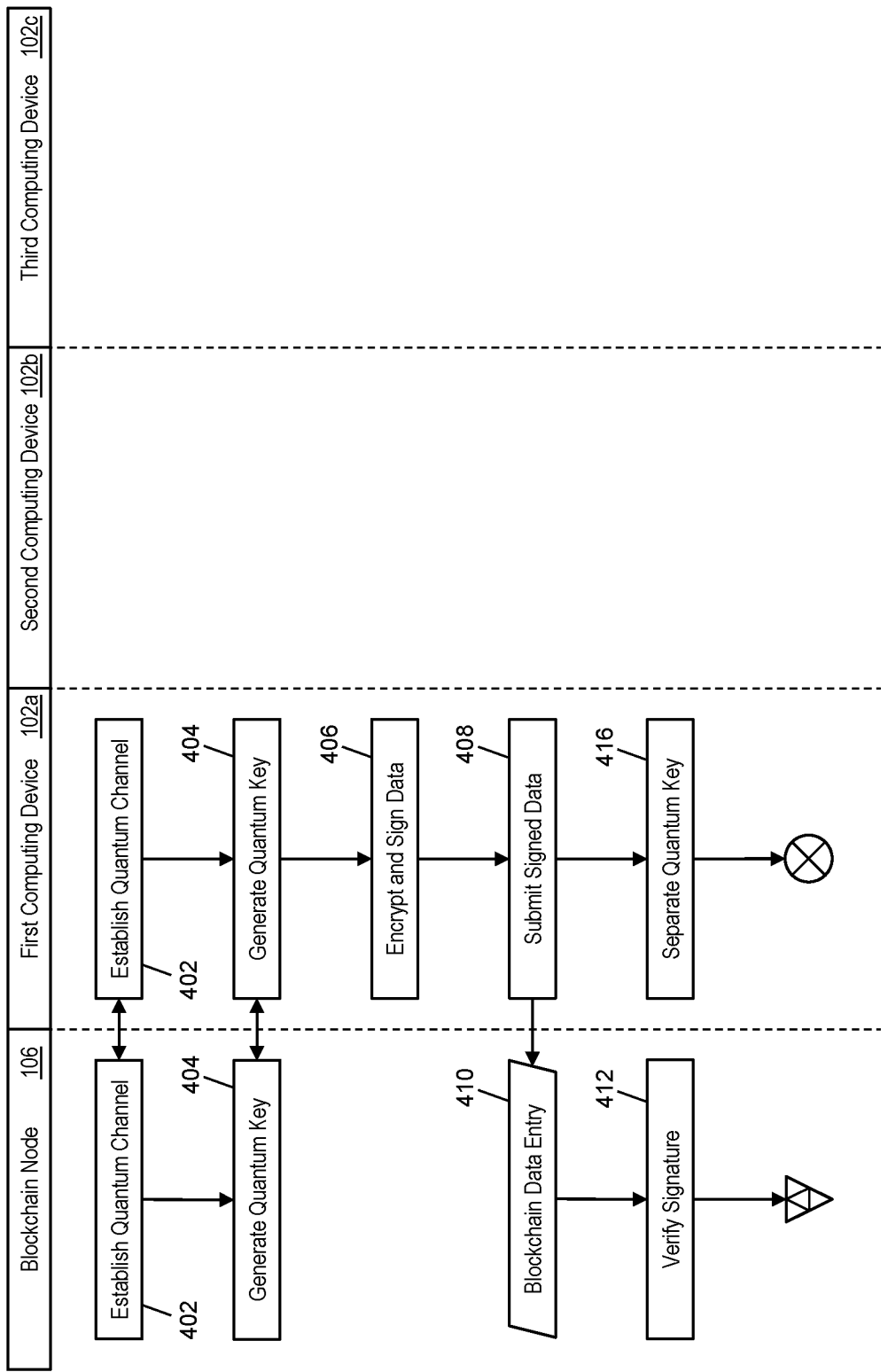
FIGS. 4A and 4B are a flow diagram illustrating a process for the improved security in blockchain using a quantum shared secret in the system of FIG. 1 in accordance with exemplary embodiments.
Figure 4B:
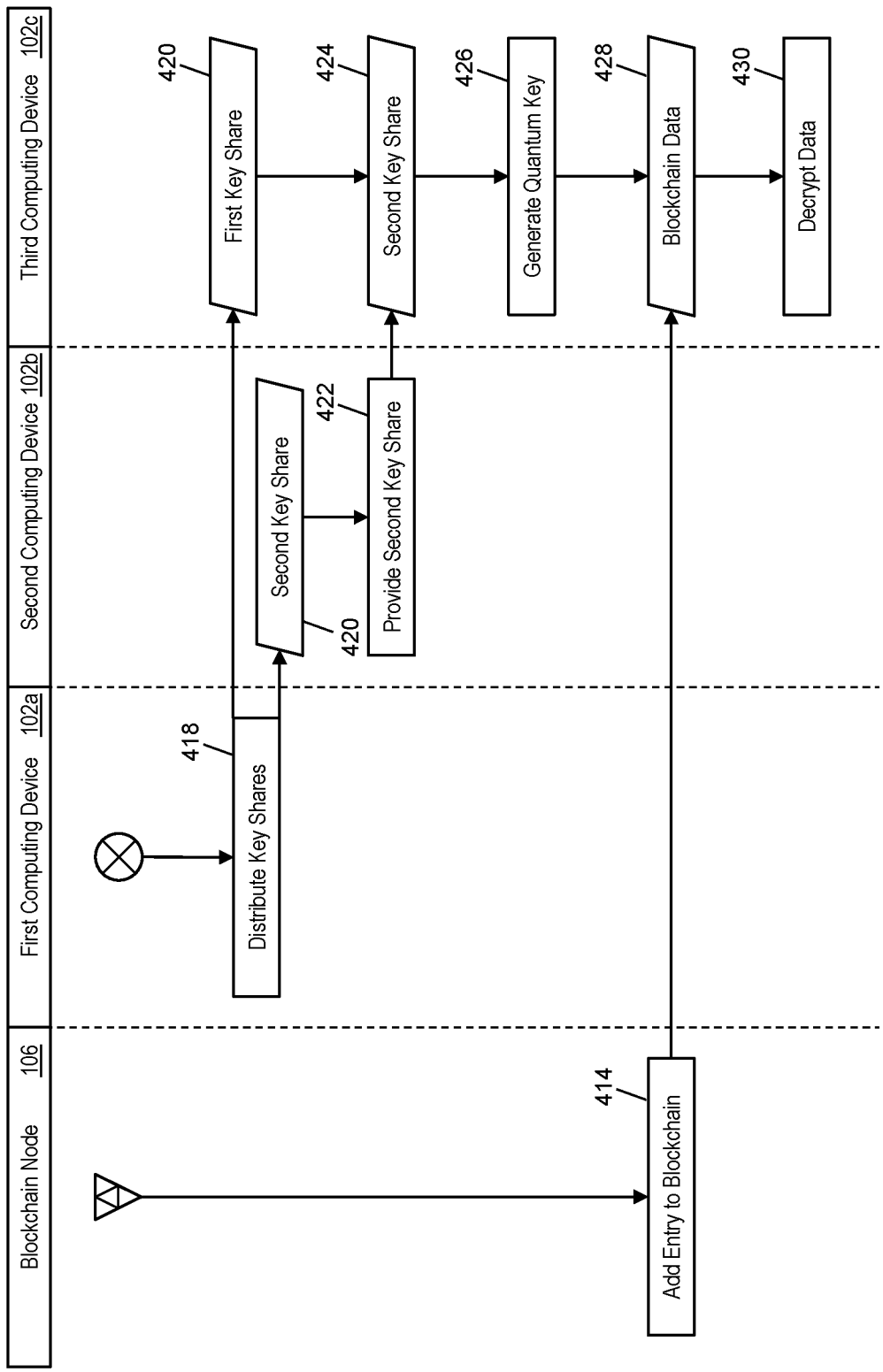

FIGS. 4A and 4B illustrate a process in the system 100 of FIG. 1 for the secure exchange of data available to multiple entities on a blockchain via the use of quantum key distribution and quantum secret sharing.

In step 402, the first computing device 102a and a blockchain node 106 in the blockchain network 104 can establish a quantum communication channel. In step 404, the first computing device 102a and the blockchain node 106 can generate a pair of quantum encryption keys using a quantum key distribution process, such as discussed above. It will be apparent to persons having skill in the relevant art that steps 302 and 304 can be performed between the first computing device 102a and any other entity for creation of the quantum keys. In other words, the quantum keys can be created between the first computing device 102a and other authorized device such that a blockchain node 106 does not need to be in possession of a quantum key for the process discussed herein but is illustrated in FIGS. 4A and 4B for convenience. In step 406, the first computing device 102a can identify data (e.g., via querying module 216) that is to be stored on the blockchain, encrypt the data (e.g., via encryption module 222) using the quantum encryption key, and digitally sign (e.g., via generation module 220) the encrypted data using a private key of a cryptographic key pair. In step 408, the first computing device 102*a* can (e.g., via the transmitting device 224) submit the signed, encrypted data to the blockchain node 106 for storage on the blockchain.

In step 410, the blockchain node 106 can receive the signed, encrypted data. In step 412, the blockchain node 106 can verify the digital signature on the received data using the public key of the cryptographic key pair. In step 414, the blockchain node 106 can add a new blockchain data entry to the blockchain that includes the encrypted data, such as by including the new blockchain data entry in a new block that is confirmed and added to the blockchain using traditional methods and systems.

In step 416, the first computing device 102*a* can (e.g., via the generation module 218) separate the quantum key into a first key share and a second key share where each share individually cannot be used but where the two key shares can be combined into the quantum key using a known scheme. In step 418, the first computing device 102*a* can (e.g., via the transmitting device 224) distribute the first and second key shares to the third computing device 102*c* and the second computing device 102*b*, respectively, using a suitable communication network and method. In some cases, the first computing device 102*a* can transmit the key shares using a standard communication channel, as interception of one key share cannot be used to compromise the quantum key. In step 420, receiving devices 202 of the second computing device 102*b* and third computing device 102*c* can receive the key shares from the first computing device 102*a*.

The third computing device 102*c* can be interested in obtaining the data stored on the blockchain. For instance, in the above example, the third computing device 102*c* can be a medical service provider interested in an individual's health profile, while the individual can operate the second computing device 102*b*. In order for the third computing device 102*c* to be able to access the unencrypted data, the transmitting device 224 of the second computing device 102*b* can, in step 422, provide the second key share for the quantum key to the third computing device 102*c* using a suitable communication network and method, such as a secure communication channel or a standard communication channel. In step 424, the receiving device 202 of the third computing device 102*c* can receive the second key share. In step 426, the third computing device 102*c* can (e.g., via the generation module 218) generate the quantum key by combining the first key share and the second key share utilizing a known scheme. In step 428, the receiving device 202 of the third computing device 102*c* can receive blockchain data that includes the blockchain data entry that stores the encrypted data that had been submitted by the first computing device 102*a*. In step 430, the third computing device 102*c* can (e.g., via the encryption module 222) decrypt the encrypted data stored in the blockchain data entry using the generated quantum key. As a result, the third computing device 102*c* is able to obtain the data, but only after receiving a key share from the second computing device 102*b*, and where the encrypted data can be publicly accessible in the blockchain but secure from decryption without access to both key shares, knowledge of the scheme, and where any attempt at fraudulently accessing the quantum key can be immediately identified via the quantum properties, providing significant security advantages over traditional systems.

Exemplary Method for Transmission Using Dynamic Waveform Encryption

Figure 5:
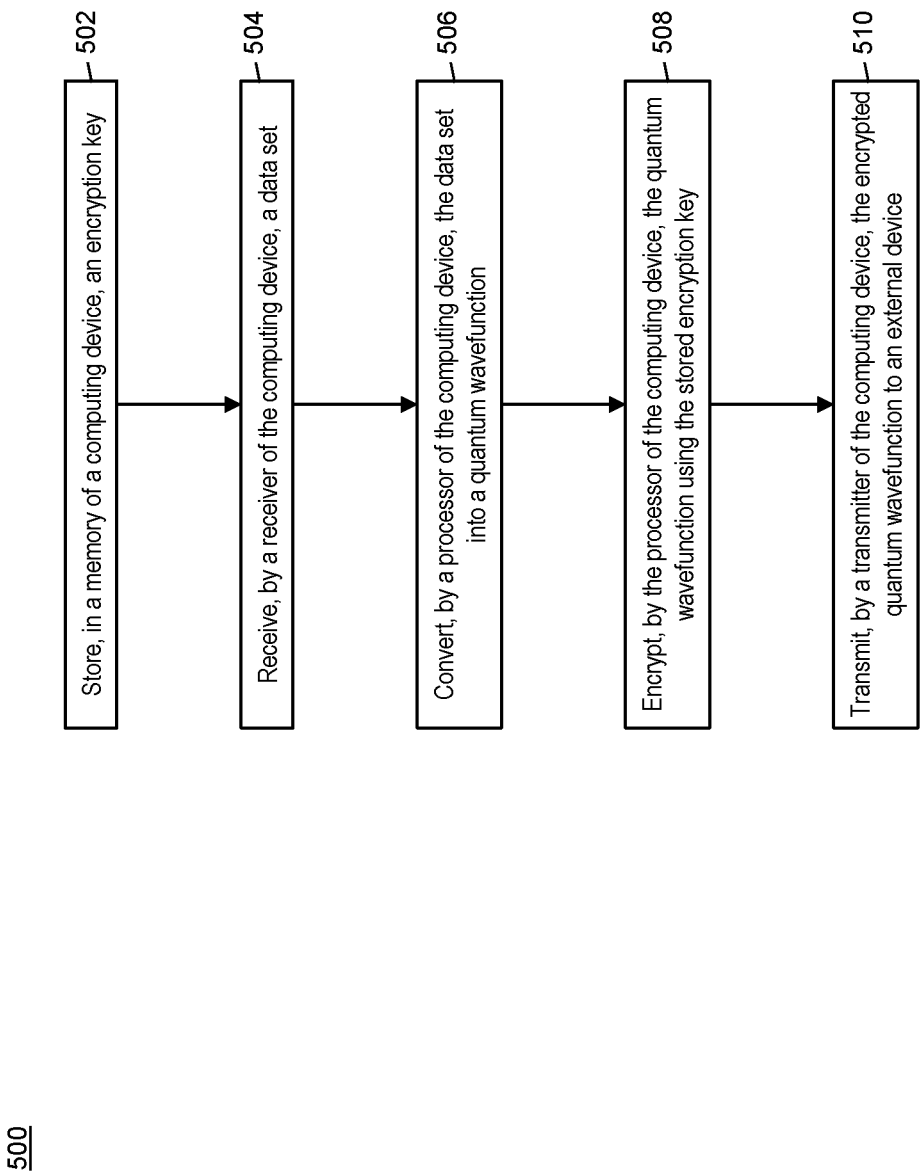
FIG. 5 is a flow chart illustrating an exemplary method for secure transmission of data using dynamic waveform encryption in accordance with exemplary embodiments.

FIG. 5 illustrates a method 500 for the secure transmission of data between two parties via the use of dynamic waveform encryption that utilizes a combination of quantum wavefunction and encryption.

In step 502, an encryption key can be stored in a memory (e.g., memory 214) of a computing device (e.g., first computing device 102*a*). In step 504, a data set can be received by a receiver (e.g., receiving device 202) of the computing device. In step 506, the data set can be converted, by a processor (e.g., generation module 218) of the computing device, into a quantum wavefunction.

In step 508, the quantum wavefunction can be encrypted by the processor (e.g., encryption module 222) of the computing device using the stored encryption key. In step 510, the encrypted quantum wavefunction can be transmitted by a transmitter (e.g., transmitting device 224) of the computing device to an external device (e.g., second computing device 102*b*).

In one embodiment, the method 500 can further include establishing, by the computing device, a first communication channel with the external device; and generating, by the computing device and the external device, the encryption key over the first communication channel using quantum key distribution, wherein the encryption key is stored in the memory of the computing device in response to generating the encryption key using quantum key distribution. In a further embodiment, the encrypted quantum wavefunction can be transmitted to the external device using the first communication channel. In another further embodiment, the method 500 can even further include establishing, by the computing device, a second communication channel with the external device, wherein the encrypted quantum wavefunction is transmitted to the external device using the second communication channel. In an even further embodiment, the first communication channel can be a quantum communication channel, and the second communication channel can be a standard communication channel.

In some embodiments, the method 500 can also include: receiving, by a receiver (e.g., receiving device 202) of the external device, the encrypted quantum wavefunction; decrypting, by a processor (e.g., encryption module 222) of the external device, the encrypted quantum wavefunction using the encryption key; and converting, by the processor (e.g., generation module 218) of the external device, the quantum wavefunction into the data set. In one embodiment, the data set can be in plaintext. In some embodiments, the encryption key can be generated using quantum key distribution between the computing device and the external device.

Exemplary Method for Quantum Key Distribution in Blockchain

Figure 6:
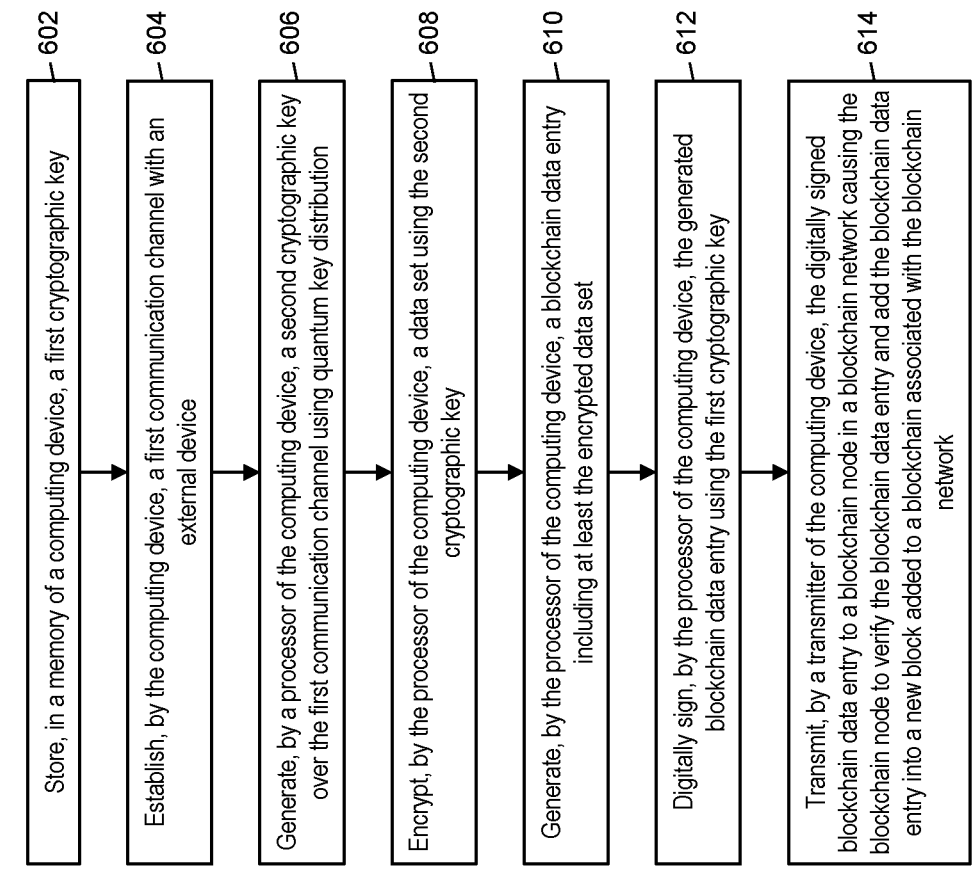
FIG. 6 is a flow chart illustrating an exemplary method for improved security in blockchains using quantum key distribution in accordance with exemplary embodiments.

FIG. 6 illustrates a method 600 for the increasing of security in blockchain using quantum key distribution for data stored in a blockchain.

In step 602, a first cryptographic key can be stored in a memory (e.g., memory 214) of a computing device (e.g., first computing device 102*a*). In step 604, a first communication channel can be established with an external device (e.g., second computing device 102*b*) by the computing device. In step 606, a second cryptographic key can be generated by a processor (e.g., generation module 218) of the computing device over the first communication channel using quantum key distribution. In step 608, a data set can be encrypted by the processor (e.g., encryption module 222) of the computing device using the second cryptographic key.

In step 610, a blockchain data entry can be generated that includes at least the encrypted data set by the processor (e.g., generation module 218) of the computing device. In step 612, the generated blockchain data entry can be digitally signed by the processor (e.g., generation module 218) of the computing device using the first cryptographic key. In step 614, the digitally signed blockchain data entry can be transmitted by a transmitter (e.g., transmitting device 224) of the computing device to a blockchain node (e.g., blockchain node 106) in a blockchain network (e.g., blockchain network 104) causing the blockchain node to verify the blockchain data entry and add the blockchain data entry into a new block added to a blockchain associated with the blockchain network.

In one embodiment, the method 600 can further include: establishing, by the computing device, a second communication channel with the blockchain node in the blockchain network; and generating, by the processor (e.g., generation module 218) of the computing device, the first cryptographic key over the second communication channel using quantum key distribution prior to storing the first cryptographic key. In some embodiments, the first cryptographic key can be a private key of a cryptographic key pair. In one embodiment, the data set can be at least one of: a cryptocurrency transaction, a smart contract, health services data, and financial data. In some embodiments, the first communication channel can be a quantum communication channel.

In one embodiment, the method 600 can also include: generating, by the processor (e.g., generation module 218) of the computing device, a plurality of shares of the second cryptographic key, wherein a predetermined number of shares is required to generate the second cryptographic key; and distributing, by the transmitter of the computing device, each share of the plurality of shares to a plurality of additional computing devices (e.g., computing devices 102). In a further embodiment, the plurality of additional computing devices can include the external device. In another further embodiment, the plurality of additional computing devices can include the blockchain node.

Computer System Architecture

FIG. 7 illustrates a computer system 700 in which embodiments of the present disclosure, or portions thereof, can be implemented as computer-readable code. For example, the computing devices 102 and blockchain nodes 106 can be implemented in the computer system 700 using hardware, non-transitory computer readable media having instructions stored thereon, or a combination thereof and can be implemented in one or more computer systems or other processing systems. Hardware can embody modules and components used to implement the methods of FIGS. 3A, 3B, 4A, 4B, 5, and 6.

If programmable logic is used, such logic can execute on a commercially available processing platform configured by executable software code to become a specific purpose computer or a special purpose device (e.g., programmable logic array, application-specific integrated circuit, etc.). A person having ordinary skill in the art can appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, at least one processor device and a memory can be used to implement the above described embodiments.

A processor unit or device as discussed herein can be a single processor, a plurality of processors, or combinations thereof. Processor devices can have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

Processor device 704 can be a special purpose or a general purpose processor device specifically configured to perform the functions discussed herein. The processor device 704 can be connected to a communications infrastructure 706, such as a bus, message queue, network, multi-core message-passing scheme, etc. The network can be any network suitable for performing the functions as disclosed herein and can include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 can also include a main memory 708 (e.g., random access memory, read-only memory, etc.), and can also include a secondary memory 710. The secondary memory 710 can include the hard disk drive 712 and a removable storage drive 714, such as a floppy disk drive, a magnetic tape drive, an optical disk drive, a flash memory, etc.

The removable storage drive 714 can read from and/or write to the removable storage unit 718 in a well-known manner. The removable storage unit 718 can include a removable storage media that can be read by and written to by the removable storage drive 714. For example, if the removable storage drive 714 is a floppy disk drive or universal serial bus port, the removable storage unit 718 can be a floppy disk or portable flash drive, respectively. In one embodiment, the removable storage unit 718 can be non-transitory computer readable recording media.

In some embodiments, the secondary memory 710 can include alternative means for allowing computer programs or other instructions to be loaded into the computer system 700, for example, the removable storage unit 722 and an interface 720. Examples of such means can include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) can be stored on any type of suitable computer readable media, such as optical storage (e.g., a compact disc, digital versatile disc, Blu-ray disc, etc.) or magnetic tape storage (e.g., a hard disk drive). The data can be configured in any type of suitable database configuration, such as a relational database, a structured query language (SQL) database, a distributed database, an object database, etc. Suitable configurations and storage types will be apparent to persons having skill in the relevant art.

The computer system 700 can also include a communications interface 724. The communications interface 724 can be configured to allow software and data to be transferred between the computer system 700 and external devices. Exemplary communications interfaces 724 can include a modem, a network interface (e.g., an Ethernet card), a communications port, a PCMCIA slot and card, etc. Software and data transferred via the communications interface 724 can be in the form of signals, which can be electronic, electromagnetic, optical, or other signals as will be apparent to persons having skill in the relevant art. The signals can travel via a communications path 726, which can be configured to carry the signals and can be implemented using wire, cable, fiber optics, a phone line, a cellular phone link, a radio frequency link, etc.

The computer system 700 can further include a display interface 702. The display interface 702 can be configured to allow data to be transferred between the computer system 700 and external display 730. Exemplary display interfaces 702 can include high-definition multimedia interface (HDMI), digital visual interface (DVI), video graphics array (VGA), etc. The display 730 can be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium can refer to memories, such as the main memory 708 and secondary memory 710, which can be memory semiconductors (e.g., DRAMs, etc.). These computer program products can be means for providing software to the computer system 700. Computer programs (e.g., computer control logic) can be stored in the main memory 708 and/or the secondary memory 710. Computer programs can also be received via the communications interface 724. Such computer programs, when executed, can enable computer system 700 to implement the present methods as discussed herein. In particular, the computer programs, when executed, can enable processor device 704 to implement the methods illustrated by FIGS. 3A, 3B, 4A, 4B, 5, and 6, as discussed herein. Accordingly, such computer programs can represent controllers of the computer system 700. Where the present disclosure is implemented using software, the software can be stored in a computer program product and loaded into the computer system 700 using the removable storage drive 714, interface 720, and hard disk drive 712, or communications interface 724.

The processor device 704 can comprise one or more modules or engines configured to perform the functions of the computer system 700. Each of the modules or engines can be implemented using hardware and, in some instances, can also utilize software, such as corresponding to program code and/or programs stored in the main memory 708 or secondary memory 710. In such instances, program code can be compiled by the processor device 704 (e.g., by a compiling module or engine) prior to execution by the hardware of the computer system 700. For example, the program code can be source code written in a programming language that is translated into a lower level language, such as assembly language or machine code, for execution by the processor device 704 and/or any additional hardware components of the computer system 700. The process of compiling can include the use of lexical analysis, preprocessing, parsing, semantic analysis, syntax-directed translation, code generation, code optimization, and any other techniques that can be suitable for translation of program code into a lower level language suitable for controlling the computer system 700 to perform the functions disclosed herein. It will be apparent to persons having skill in the relevant art that such processes result in the computer system 700 being a specially configured computer system 700 specifically programmed to perform the functions discussed above.

Techniques consistent with the present disclosure provide, among other features, systems and methods for secure transmission of data using dynamic waveform encryption and the improved security of blockchains using quantum key distribution. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or can be acquired from practicing of the disclosure, without departing from the breadth or scope.

What is claimed is:

1. A method for improved security in blockchains using quantum key distribution, comprising:
    storing, in a memory of a computing device, a first cryptographic key;
    establishing, by the computing device, a first communication channel with an external device;
    generating, by a processor of the computing device, a second cryptographic key over the first communication channel using quantum key distribution;
    encrypting, by the processor of the computing device, a data set using the second cryptographic key;
    generating, by the processor of the computing device, a blockchain data entry including at least the encrypted data set;
    digitally signing, by the processor of the computing device, the generated blockchain data entry using the first cryptographic key; and
    transmitting, by a transmitter of the computing device, the digitally signed blockchain data entry to a blockchain node in a blockchain network causing the blockchain node to verify the blockchain data entry and add the blockchain data entry into a new block added to a blockchain associated with the blockchain network.

2. The method of claim 1, further comprising:
    establishing, by the computing device, a second communication channel with the blockchain node in the blockchain network; and
    generating, by the processor of the computing device, the first cryptographic key over the second communication channel using quantum key distribution prior to storing the first cryptographic key.

3. The method of claim 1, wherein the first cryptographic key is a private key of a cryptographic key pair.

4. The method of claim 1, further comprising:
    generating, by the processor of the computing device, a plurality of shares of the second cryptographic key, wherein a predetermined number of shares is required to generate the second cryptographic key; and
    distributing, by the transmitter of the computing device, each share of the plurality of shares to a plurality of additional computing devices.

5. The method of claim 4, wherein the plurality of additional computing devices includes the external device.

6. The method of claim 4, wherein the plurality of additional computing devices includes the blockchain node.

7. The method of claim 1, wherein the data set is at least one of: a cryptocurrency transaction, a smart contract, health services data, and financial data.

8. The method of claim 1, wherein the first communication channel is a quantum communication channel.

9. A system for improved security in blockchains using quantum key distribution, comprising:
   a computing device;
   an external device; and
   a blockchain network including a blockchain node, wherein
   the computing device establishes a first communication channel with an external device and includes
      a memory storing a first cryptographic key,
      a processor generating a second cryptographic key over the first communication channel using quantum key distribution, encrypting a data set using the second cryptographic key, generating a blockchain data entry including at least the encrypted data set, and digitally signing the generated blockchain data entry using the first cryptographic key, and
      a transmitter transmitting the digitally signed blockchain data entry to the blockchain node causing the blockchain node to verify the blockchain data entry and add the blockchain data entry into a new block added to a blockchain associated with the blockchain network.

10. The system of claim 9, wherein
    the computing device establishes a second communication channel with the blockchain node in the blockchain network, and
    the processor of the computing device generates the first cryptographic key over the second communication channel using quantum key distribution prior to storing the first cryptographic key.

11. The system of claim 9, wherein the first cryptographic key is a private key of a cryptographic key pair.

12. The system of claim 9, wherein
    the processor of the computing device generates a plurality of shares of the second cryptographic key, wherein a predetermined number of shares is required to generate the second cryptographic key, and
    the transmitter of the computing device distributes each share of the plurality of shares to a plurality of additional computing devices.

13. The system of claim 12, wherein the plurality of additional computing devices includes the external device.

14. The system of claim 12, wherein the plurality of additional computing devices includes the blockchain node.

15. The system of claim 9, wherein the data set is at least one of: a cryptocurrency transaction, a smart contract, health services data, and financial data.

16. The system of claim 9, wherein the first communication channel is a quantum communication channel.

* * * * *